United States Patent [19]

Miyata et al.

[11] Patent Number: 5,357,036
[45] Date of Patent: Oct. 18, 1994

[54] ORGANIC SURFACE-TREATING AGENT

[75] Inventors: Kazushi Miyata, Osaka; Shoji Saibara, Takatsuki; Tomohiro Harada, Kyoto, all of Japan

[73] Assignee: Hitachi Maxell, Ltd., Osaka, Japan

[21] Appl. No.: 793,382

[22] PCT Filed: May 16, 1991

[86] PCT No.: PCT/JP91/00647
§ 371 Date: Jan. 15, 1992
§ 102(e) Date: Jan. 15, 1992

[87] PCT Pub. No.: WO91/18060
PCT Pub. Date: Nov. 28, 1991

[30] Foreign Application Priority Data

May 16, 1990 [JP] Japan ................................. 2-126250

[51] Int. Cl.$^5$ ................................................ C08G 75/00
[52] U.S. Cl. ............................................ 528/373; 106/2
[58] Field of Search ............................. 528/373; 106/2

[56] References Cited

U.S. PATENT DOCUMENTS 3,005,803 10/1961 Holtschmidt et al. ............ 528/373
4,745,175 5/1988 Scholl et al. ...................... 528/373

Primary Examiner—John Kight, III
Assistant Examiner—T. Mosley
Attorney, Agent, or Firm—Birch, Stewart, Kolasch & Birch

[57] ABSTRACT

An organic surface-treating agent consisting of a compound which has a lipophilic linear backbone comprising carbon and hydrogen atoms; at least two side chains having an ester, ether, ketone or phenyl group on the backbone chain; a hydrophilic or reactive functional group on at least one molecular end; and a number average molecular weight of at least 300, which improves dispersibility of an inorganic material in an organic solvent when used as a surface-treating agent or a dispersant for the inorganic material.

7 Claims, No Drawings

ORGANIC SURFACE-TREATING AGENT

BACKGROUND OF THE INVENTION

1. Field of the Invention

The present invention relates to an organic surface-treating agent and more specifically to an organic surface-treating agent which is useful as a surface-treating and dispersing agent for an inorganic material, in particular, an inorganic powder, to increase its dispersibility in a solvent.

2. Description of the Related Art

In general, since the surface of an inorganic material or powder is hydrophilic, its wettability and dispersibility with an organic solvent or a polymeric binder is poor. Therefore, in the production of paints, it has been the practice to modify the surface of the inorganic material or inorganic powder with a silane coupling agent (see Elements of Chemistry (Kagaku Sosetsu) No 44, "Surface Modification" edited by Japan Chemical Society (published by Gakkai Shuppan Center)).

In addition, dispersibility of the inorganic powder is important, in particular, in the production of a magnetic paint, since the recording density of a magnetic recording medium which is produced using the magnetic paint directly relates to the dispersibility.

In the field of magnetic paint, based on the basic idea that the dispersibility of magnetic powder or a filler can be improved by the use of a dispersant which has a hydrophilic or reactive functional group on at least one end of a lipophilic backbone of a molecule, the surface of such a powder is modified with a fatty acid or various surfactants as a surface-treating agent (cf. Japanese Patent Kokai Publication No. 102504/1983), or a silane coupling agent or a titanium coupling agent (cf. Japanese Patent Kokai Publication Nos. 125539/1980 and 58135/1981).

As suitable organic solvents in which an organic material is dissolved, toluene, MEK, ethyl acetate, THF and the like are known. Ethyl acetate contains an ester group, THF contains an ether group, MEK contains a ketone group, and toluene contains a phenyl group.

Since the conventional fatty acid or silane coupling agent does not contain the ester, ether or phenyl group in its backbone, it has poor compatibility with these organic solvents.

In addition, since such a fatty acid or silane coupling agent has a very small average molecular weight, it cannot increase the distance between particles of the organic powder. Therefore, the once dispersed organic powder particles recoagulate.

Such a fatty acid or silane coupling agent is insufficient for dispersing the organic powder stably in the presence of the organic solvent.

It has been tried to increase the dispersing capability of the polymeric binder for the inorganic powder by incorporating a hydrophilic or reactive functional group such as a sulfonic acid group, a phosphoric acid group, a carboxylic acid group or their salts, or a tertiary amino group in the molecular chain of the binder (Japanese Patent Kokai Publication Nos. 13520/1981, 117734/1980 and 13223/1989). However, such polymeric binders do not have sufficient dispersing capability, and it is necessary to provide a new surface treating technique in order to increase dispersibility.

SUMMARY OF THE INVENTION

The present invention intends to solve the drawbacks of the above conventional surface treating techniques and to provide an organic surface-treating agent which can have a good surface-treating effect, in a very small amount, because it has a molecular size sufficient for separating inorganic powder particles and, a hydrophilic or reactive functional group at molecular chain ends, so as to exert most effectively the function of the hydrophilic or reactive functional group.

As a result of extensive study by the present inventors on the increase of the surface-treating effect, it has been found that an organic surface-treating agent which shows a significant increase in surface treating effect on an inorganic material, in particular, an inorganic powder, can be obtained, first, by the introduction of a hydrophilic or reactive functional group, such as a sulfonic acid group, a phosphoric acid group, a carboxylic acid group or their salts or a tertiary amino group at a molecular end; second, by the limitation of a number average molecular weight of the agent to at least 300 and preferably at least 800, preferably not larger than 25,000, more preferably in the range between 1500 and 10,000; and third, by the provision of at least two side chains having an ester, ether, ketone or phenyl group on a backbone chain.

A reason for such an effect may be presumed as follows;

The hydrophilic or reactive functional group which is introduced at the molecular end of the organic agent is adsorbed by or reacts with the surface of the inorganic material as an adsorbing anchor. The adsorbed or reacted molecules are aligned as if they were tines of a comb so that they change the surface property of the inorganic material from being hydrophilic to lipophilic, in particular, organophilic and then greatly increase the dispersibility of, in particular, the inorganic powder.

The hydrophilic or reactive functional group is preferably selected from $-COOX$, $-OH$, $NH_2$, $-NH_3$, $NHR$, $-NH_2R$, $-NRR'$, $-NH^{3+}$, $-NH_2R^{30}$, $-NHRR'^{+}$, $-NRR'R''^{+}$, $-SO_3X$, $-OSO_3X$, $-OP(O)-(OX)_2$, $-OP(O)(OX)(OR)$, $-OP(O)(OR)_2$, $-P(O)(OX)_2$, $-P(O)(OX)-(OR)$, $-P(O)(OR)_2$, $-Si(OR)_2$, $Si(OR)_3$, $-SiR(OR')_2$, $-N=C=O$ and $-CH(O)CH_2$, wherein X is a hydrogen atom or a metal atom, and R, R' and R'' are each an alkyl group. More preferably, the functional group is selected from $-COOX$, $-NH_2$, $-NHR$, $-NRR'$, $-SO_3X$, $-OSO_3X$, $-OP(O)(OX)_2$, $-P(O)(OX)_2$, $-Si(OR)_3$, $-SiR(OR')_2$ and $-CH(O)CH_2$ wherein X is a hydrogen atom or a metal atom, and R and R' are each an alkyl group.

The surface treating effect of the agent can be further increased by the incorporation of one of $-COOH$, $-OH$, $-NH_2$, $-NHR$, $-NRR'$, $-CH(O)CH_2$ (wherein R and R' are each an alkyl group) and an ammonium salt in the side chain of the backbone chain.

The synthesis method of such an organic compound is not critical. For example, a vinyl compound is polymerized using a compound having the hydrophilic group (e.g. COOH) as an initiator, or by a macromonomer method using a chain transfer agent having a hydrophilic or reactive functional group.

As the polymerization initiator, α, α, -azi-obisisobutyronitrile, benzoyl peroxide and the like may be used. As the chain transfer agent, thioglycerin, thioglycolic acid, sodium 2-mercaptoethanesulfonate, mercaptobenzothiazole and the like may be used.

PREFERRED EMBODIMENTS OF THE INVENTION

The present invention will be illustrated by the following examples, which do not limit the scope of the present invention.

Synthesis of Surface Treating Agents

EXAMPLE 1

| | |
|---|---|
| Methyl methacrylate | 0.9 mole part |
| α,α'-Azobisisobutyronitrile | 0.01 mole part |
| Thioglycerin | 0.03 mole part |

Based on 100 parts by weight of the above starting components,

| | |
|---|---|
| THF | 100 parts by weight | was used as a solvent.

The above mixture was charged in a flask equipped with a condenser. After thoroughly replacing the system atmosphere with nitrogen, the mixture was reacted at 60° C. for 20 hours while stirring well. The reaction mixture was purified by precipitating it in petroleum ether and water and then dried under reduced pressure at 60° C. for 8 hours.

A number average molecular weight of the obtained organic surface-treating agent was 3.0×10³ by the vapor pressure osmometry. The introduction of the hydroxyl groups was confirmed by NMR and IR. The uniform introduction of the hydroxyl groups at the molecular ends was confirmed by thin layer chromatography and high resolution NMR.

Accordingly, the molecular structure of the organic surface-treating agent was identified as follow:

$$\text{H(CH}_2\text{—}\underset{\underset{\text{COOCH}_3}{|}}{\overset{\overset{\text{CH}_3}{|}}{\text{C}}})_m\text{—S—CH}_2\text{CHCH}_2\text{OH}$$
$$\phantom{\text{H(CH}_2\text{—C)}_m\text{—S—CH}_2\text{C}}\overset{|}{\text{OH}}$$

(m = 28.9)

EXAMPLE 2

| | |
|---|---|
| Methyl methacrylate | 0.9 mole part |
| 2-Hydroxyethyl methacrylate | 0.02 mole part |
| α,α'-Azobisisobutyronitrile | 0.01 mole part |
| Thioglycolic acid | 0.03 mole part |

Based on 100 parts by weight of the above starting components,

| | |
|---|---|
| THF | 60 parts by weight |
| Ethanol | 40 parts by weight | were used as a solvent.

The above mixture was charged in a flask equipped with a condenser. After thoroughly replacing the system atmosphere with nitrogen, the mixture was reacted at 60° C. for 20 hours while stirring well. The reaction mixture was purified by precipitating it in petroleum ether and water and then dried under reduced pressure at 60° C. for 8 hours.

A number average molecular weight of the obtained organic surface-treating agent was 3.4×10³ by the vapor pressure osmometry. The introduction of the hydroxyl groups was confirmed by NMR and IR. The uniform introduction of the carboxyl groups at the molecular ends was confirmed by thin layer chromatography and high resolution NMR.

Accordingly, the molecular structure of the organic surface-treating agent was identified as follow:

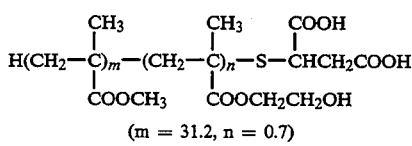

(m = 31.2, n = 0.7)

EXAMPLE 3

| | |
|---|---|
| Methyl methacrylate | 0.9 mole part |
| 2-Hydroxyethyl methacrylate | 0.02 mole part |
| α,α'-Azobisisobutyronitrile | 0.01 mole part |
| Sodium 2-mercaptoethanesulfonate | 0.03 mole part |

Based on 100 parts by weight of the above starting components,

| | |
|---|---|
| THF | 20 parts by weight |
| Ethanol | 40 parts by weight | were used as a solvent.

The above mixture was charged in a flask equipped with a condenser. After thoroughly replacing the system atmosphere with nitrogen, the mixture was reacted at 60° C. for 20 hours while stirring well. During polymerization, 40 parts by weight of THF was added. The reaction mixture was purified by precipitating it in petroleum ether and water and then dried under reduced pressure at 60° C. for 8 hours.

A number average molecular weight of the obtained organic surface-treating agent was 4.1×10³ by the vapor pressure osmometry. The introduction of the hydroxyl groups was confirmed by NMR and IR. The uniform introduction of the sodium sulfonate groups at the molecular ends was confirmed by thin layer chromatography and high resolution NMR.

Accordingly, the molecular structure of the organic surface-treating agent was identified as follow:

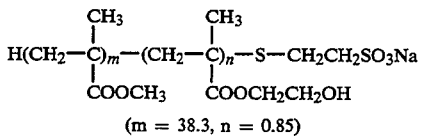

(m = 38.3, n = 0.85)

EXAMPLE 4

| | |
|---|---|
| Methyl methacrylate | 0.9 mole part |
| 2-Hydroxyethyl methacrylate | 0.02 mole part |
| α,α'-Azobisisobutyronitrile | 0.01 mole part |
| Mercaptobenzothiazole | 0.035 mole part |

Based on 100 parts by weight of the above starting components,

| THF | 100 parts by weight | was used as a solvent.

The above mixture was charged in a flask equipped with a condenser. After thoroughly replacing the system atmosphere with nitrogen, the mixture was reacted at 60° C. for 20 hours while stirring well. The reaction mixture was purified by precipitating it in petroleum ether and water and then dried under reduced pressure at 60° C. for 8 hours.

A number average molecular weight of the obtained organic surface-treating agent was $2.5 \times 10^3$ by the vapor pressure osmometry. The introduction of the hydroxyl groups was confirmed by NMR and IR. The uniform introduction of the benzothiazole groups at the molecular ends was confirmed by thin layer chromatography and high resolution NMR.

Accordingly, the molecular structure of the organic surface-treating agent was identified as follow:

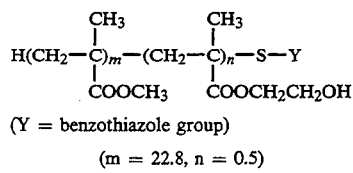

(Y = benzothiazole group)

(m = 22.8, n = 0.5)

EXAMPLE 5

In the same manner as in Example 2 but using styrene in place of methyl methacrylate, a surface-treating agent was synthesized. After reaction, a solution of sodium hydroxide in ethanol (0.006 mole part of sodium hydroxide) was added, then the reaction mixture was purified in the same manner and the terminal carboxylate groups were confirmed. A number average molecular weight of the obtained organic surface-treating agent was $3.3 \times 10^3$ by the vapor pressure osmometry.

Accordingly, the molecular structure of the organic surface-treating agent was identified as follow:

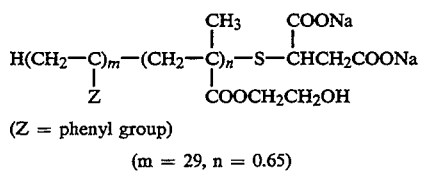

(Z = phenyl group)

(m = 29, n = 0.65)

EXAMPLE 6

In Example 1, after the synthesis reaction, 0.1 mole part of phosphorus oxychloride was added, and the mixture was well stirred at room temperature for 2 days. Then, the surface-treating agent was thoroughly washed with water and purified in the same manner and the terminal phosphoric acid groups were confirmed. A number average molecular weight of the obtained organic surface-treating agent was $3.2 \times 10^3$ by the vapor pressure osmometry.

Accordingly, the molecular structure of the organic surface-treating agent was identified as follow:

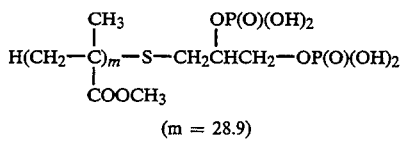

(m = 28.9)

EXAMPLE 7

To the surface-treating agent obtained in Example 6, sodium hydroxide was added in the same manner as in Example 5. Then, the terminal phosphoric acid groups were confirmed. A number average molecular weight of the obtained organic surface-treating agent was $3.0 \times 10^3$ by the vapor pressure osmometry.

Accordingly, the molecular structure of the organic surface-treating agent was identified as follow:

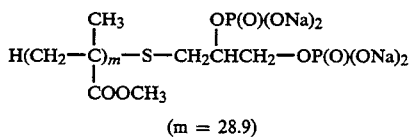

(m = 28.9)

EXAMPLE 8

| Methyl methacrylate | 0.9 mole part |
| $\alpha,\alpha'$-Azobisisobutyronitrile | 0.01 mole part |
| Thioglycerin | 0.013 mole part |

Based on 100 parts by weight of the above starting components,

| THF | 100 parts by weight | was used as a solvent.

The above mixture was charged in a flask equipped with a condenser. After thoroughly replacing the system atmosphere with nitrogen, the mixture was reacted at 60° C. for 20 hours while stirring well. The reaction mixture was purified by precipitating it in petroleum ether and water and then dried under reduced pressure at 60° C. for 8 hours.

A number average molecular weight of the obtained organic surface-treating agent was $5.3 \times 10^3$ by the vapor pressure osmometry. The introduction of the hydroxyl groups was confirmed by NMR and IR. The uniform introduction of the hydroxyl groups at the molecular ends was confirmed by thin layer chromatography and high resolution NMR.

Accordingly, the molecular structure of the organic surface-treating agent was identified as follow:

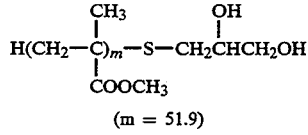

(m = 51.9)

EXAMPLE 9

| Methyl methacrylate | 0.9 mole part |
| $\alpha,\alpha'$-Azobisisobutyronitrile | 0.007 mole part |

| -continued | |
|---|---|
| Thioglycerin | 0.005 mole part |

Based on 100 parts by weight of the above starting components,

| THF | 100 parts by weight |
|---|---| was used as a solvent.

The above mixture was charged in a flask equipped with a condenser. After thoroughly replacing the system atmosphere with nitrogen, the mixture was reacted at 60° C. for 20 hours while stirring well. The reaction mixture was purified by precipitating it in petroleum ether and water and then dried under reduced pressure at 60° C. for 8 hours.

A number average molecular weight of the obtained organic surface-treating agent was $8.9 \times 10^3$ by the vapor pressure osmometry. The introduction of the hydroxyl groups was confirmed by NMR and IR. The uniform introduction of the hydroxyl groups at the molecular ends was confirmed by thin layer chromatography and high resolution NMR.

Accordingly, the molecular structure of the organic surface-treating agent was identified as follow:

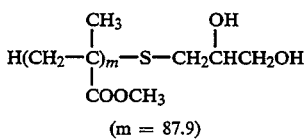

(m = 87.9)

EXAMPLE 10

| Methyl methacrylate | 0.9 mole part |
|---|---|
| 2-Hydroxyethyl methacrylate | 0.02 mole part |
| α,α'-Azobisisobutyronitrile | 0.01 mole part |
| Mercaptopropionic acid | 0.03 mole part |

Based on 100 parts by weight of the above starting components,

| THF | 100 parts by weight |
|---|---| was used as a solvent.

The above mixture was charged in a flask equipped with a condenser. After thoroughly replacing the system atmosphere with nitrogen, the mixture was reacted at 60° C. for 20 hours while stirring well. The reaction mixture was purified by precipitating it in petroleum ether and water and then dried under reduced pressure at 60° C. for 8 hours.

A number average molecular weight of the obtained organic surface-treating agent was $3.4 \times 10^3$ by the vapor pressure osmometry. The introduction of the hydroxyl groups was confirmed by NMR and IR. The uniform introduction of the carboxyl groups at the molecular ends was confirmed by thin layer chromatography and high resolution NMR.

Accordingly, the molecular structure of the organic surface-treating agent was identified as follow:

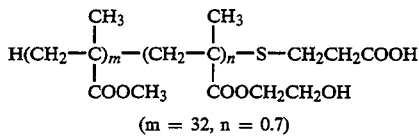

(m = 32, n = 0.7)

EXAMPLE 11

| Styrene | 0.9 mole part |
|---|---|
| α,α'-Azobisisobutyronitrile | 0.01 mole part |
| 3-Mercaptopropyltrimethoxysilane | 0.03 mole part |

Based on 100 parts by weight of the above starting components,

| THF | 100 parts by weight |
|---|---| was used as a solvent.

The above mixture was charged in a flask equipped with a condenser. After thoroughly replacing the system atmosphere with nitrogen, the mixture was reacted at 60° C. for 20 hours while stirring well. The reaction mixture was purified by precipitating it in petroleum ether and water and then dried under reduced pressure at 60° C. for 8 hours.

A number average molecular weight of the obtained organic surface-treating agent was $5.1 \times 10^3$ by the vapor pressure osmometry. The uniform introduction of the tri-methoxysilyl groups at the molecular ends was confirmed by thin layer chromatography and high resolution NMR.

Accordingly, the molecular structure of the organic surface-treating agent was identified as follow:

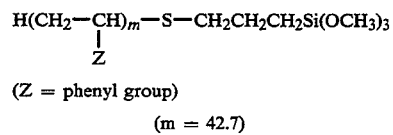

(Z = phenyl group)

(m = 42.7)

EXAMPLE 12

| Methyl methacrylate | 0.9 mole part |
|---|---|
| 2-Hydroxyethyl methacrylate | 0.02 mole part |
| Dimethylaminoethyl methacrylate | 0.02 mole part |
| α,α'-Azobisisobutyronitrile | 0.01 mole part |
| Mercaptopropionic acid | 0.03 mole part |

Based on 100 parts by weight of the above starting components,

| THF | 100 parts by weight |
|---|---| was used as a solvent.

The above mixture was charged in a flask equipped with a condenser. After thoroughly replacing the system atmosphere with nitrogen, the mixture was reacted at 60° C. for 20 hours while stirring well. The reaction mixture was purified by precipitating it in petroleum ether and water and then dried under reduced pressure at 60° C. for 8 hours.

A number average molecular weight of the obtained organic surface-treating agent was $3.7 \times 10^3$ by the vapor pressure osmometry. The introduction of the hydroxyl groups and the amino groups was confirmed by NMR and IR. The uniform introduction of the carboxyl groups at the molecular ends was confirmed by thin layer chromatography and high resolution NMR.

Accordingly, the molecular structure of the organic surface-treating agent was identified as follow:

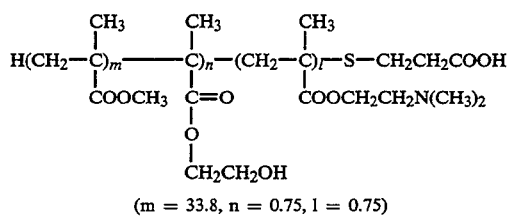

(m = 33.8, n = 0.75, l = 0.75)

The effects of the above twelve surface-treating agents according to the present invention will be explained below. As is apparent from a close inspection of the above surface-treating agents the repeating units (m) consist of carbon and hydrogen atoms forming the backbone of the lipophilic linear backbone chain. The presence of sulfur or oxygen is not within the repeating units.

The surface modifying effect on powder will be illustrated by making reference to titanium oxide.

Application Example 1

Substantially spherical white titanium oxide having an average diameter of 1 μm (100 parts by weight) was charged in a three-necked flask equipped with a condenser and a stirrer. After adding toluene (400 parts) and MEK (400 parts), the organic surface-treating agent obtained in Example 1 (2 parts) was added and stirred well for 2 hours followed by refluxing for 8 hours while thoroughly stirring. After kept standing at room temperature for 72 hours, the mixture was filtered and aged at 50° C. for 4 hours. The treated titanium oxide was well washed.

Application Example 2

In Application Example 1, the organic surface-treating agent obtained in Example 2 was used in place of the organic surface-treating agent obtained in Example 1.

Application Example 3

In Application Example 1, the organic surface-treating agent obtained in Example 3 was used in place of the organic surface-treating agent obtained in Example 1.

Reference Example 1

In Application Example 1, a sodium salt of di-2-ethylhexyl sulfosuccinate ( a surfactant; Aerosol ( a trade name) OT, distributed by Nakaraitesk) was used in place of the organic surface-treating agent obtained in Example 1.

Reference Example 2

In Application Example 1, octadecyltriethoxysilane (a silane coupling agent manufactured by Tisso) was used in place of the organic surface-treating agent obtained in Example 1.

Reference Example 3

In Application Example 1, a titanium base coupling agent (TTS (a trade name) manufactured by Ajinomoto) was used in place of the organic surface-treating agent obtained in Example 1.

The titanium oxide powders treated in Application Examples 1 to 3 and Reference Examples 1 to 3 and also untreated titanium oxide as a Reference Example 4 were subjected to the measurement of a sedimentation volume in MEK as follows:

Titanium oxide powder (0.1 g) was weighed in a sampling tube and MEK (100 g) was added. Then, the powder was dispersed by ultrasonic wave for 6 hours. After kept standing for 12 hours, a sedimentation volume was measured. The results are shown in Table 1.

TABLE 1

|  | Sedimentation volume (cm$^3$) |
|---|---|
| Application Example 1 | 1.3 |
| Application Example 2 | 0.9 |
| Application Example 3 | 0.9 |
| Reference Example 1 | 2.7 |
| Reference Example 2 | 2.8 |
| Reference Example 3 | 3.1 |
| Reference Example 4 | 6.2 |

As seen from the above results, with the organic surface-treating agents of the present invention, the organic powder can be well dispersed. This is clear from the decrease of the sedimentation volume.

The surface modifying effect on the organic material powder will be illustrated by making reference to a stainless steel plate (Ra=0.1 μm) a surface of which has been well cleaned.

Application Example 4

The stainless steel plate was dipped in MEK containing 1% by weight of the organic surface-treating agent obtained in Example 1 for 2 hours followed by aging at 50° C. for 4 hours. Then, the treated plate was well washed with MEK.

Application Example 5

In Application Example 4, the organic surface-treating agent obtained in Example 3 was used in place of the organic surface-treating agent obtained in Example 1.

Reference Example 5

In Application Example 4, the silane coupling agent used in Reference Example 2 was used in place of the organic surface-treating agent obtained in Example 1.

Reference Example 6

In Application Example 1, the titanium base coupling agent used in Reference Example 3 was used in place of the organic surface-treating agent obtained in Example 1.

On the stainless steel plates treated in Application Examples 4 and 5 and Reference Examples 5 and 6 and also an untreated stainless steel plate as a Reference Example 7, contact angles of water and toluene were measured. The results are shown in Table 2.

TABLE 2

|  | Contact angle (degrees) | |
|---|---|---|
|  | Water | Toluene |
| Application Example 4 | 90 | <20 |

TABLE 2-continued

| | Contact angle (degrees) | |
|---|---|---|
| | Water | Toluene |
| Application Example 5 | 95 | <20 |
| Reference Example 5 | 100 | 60 |
| Reference Example 6 | 105 | 55 |
| Reference Example 7 | <20 | <20 |

From the above results, it is understood that the surface of the inorganic material can be changed from hydrophilic to organophilic with the organic surface-treating agents of the present invention.

Further, the organic surface-treating agents of the present invention not only modify the surface of the inorganic material but also can be used in a production step of an industrial product. In particular, the utility of the present invention will be illustrated by making reference to the surface treatment of ferromagnetic powder in the production of a magnetic paint and a magnetic recording medium in which the ferromagnetic powder as the organic powder should be thoroughly dispersed.

Reference Example 8

| Ferromagnetic powder | 300 wt. parts |
|---|---|
| (coercive force: 1500 Oe, saturation magnetization: 120 emu/g) | |
| Vinyl chloride/vinyl acetate/ vinyl alcohol copolymer (VAGH manufactured by UCC) | 65 wt. parts |
| Carbon black | 10 wt. parts |
| Aluminum powder | 10 wt. parts |
| Myristic acid | 3 wt. parts |
| n-Butyl stearate | 6 wt. parts |
| Cyclohexanone | 395 wt. parts |
| Toluene | 395 wt. parts |

A composition of the above components was mixed and dispersed in a sand grinder mill to prepare a magnetic paint. To this paint, a polyfunctional isocyanate cross-linking agent (10 parts by weight) was added and coated on a polyethylene film having a thickness of 14 μm to a dry thickness of about 2.5 μm and dried. After calendering, the film was slit to a width of 8 mm to produce a magnetic tape.

Reference Example 9

In the same manner as in Reference Example 8 except that a vinyl chloride base surface-treating agent containing a sulfonic acid salt group and a hydroxyl group in place of the vinyl chloride/vinyl acetate/vinyl alcohol (VAGH manufactured by UCC), a magnetic tape was produced.

Application Example 6

In the same manner as in Reference Example 8 except that 60 parts by weight of a vinyl chloride/vinyl acetate/vinyl alcohol copolymer (VAGH manufactured by UCC) and 5 parts by weight of the organic surface-treating agent obtained in Example 1 were used in place of 65 parts by weight of the vinyl chloride/vinyl acetate/vinyl alcohol (VAGH manufactured by UCC), a magnetic tape was produced.

Application Example 7

In the same manner as in Reference Example 8 except that 60 parts by weight of a vinyl chloride/vinyl acetate/vinyl alcohol copolymer (VAGH manufactured by UCC) and 5 parts by weight of the organic surface-treating agent obtained in Example 2 were used in place of 65 parts by weight of the vinyl chloride/vinyl (VAGH manufactured by UCC), a magnetic tape was produced.

Application Example 8

In the same manner as in Reference Example 8 except that 60 parts by weight of a vinyl chloride/vinyl acetate/vinyl alcohol copolymer (VAGH manufactured by UCC) and 5 parts by weight of the organic surface-treating agent obtained in Example 3 were used in place of 65 parts by weight of the vinyl chloride/vinyl (VAGH manufactured by UCC), a magnetic tape was produced.

Application Example 9

In the same manner as in Reference Example 8 except that 60 parts by weight of a vinyl chloride/vinyl acetate/vinyl alcohol copolymer (VAGH manufactured by UCC) and 5 parts by weight of the organic surface-treating agent obtained in Example 4 were used in place of 65 parts by weight of the vinyl chloride/vinyl (VAGH manufactured by UCC), a magnetic tape was produced.

Application Example 10

In the same manner as in Reference Example 8 except that 60 parts by weight of a vinyl chloride/vinyl acetate/vinyl alcohol copolymer (VAGH manufactured by UCC) and 5 parts by weight of the organic surface-treating agent obtained in Example 5 were used in place of 65 parts by weight of the vinyl chloride/vinyl (VAGH manufactured by UCC), a magnetic tape was produced.

Application Example 11

In the same manner as in Reference Example 8 except that 60 parts by weight of a vinyl chloride/vinyl acetate/vinyl alcohol copolymer (VAGH manufactured by UCC) and 5 parts by weight of the organic surface-treating agent obtained in Example 6 were used in place of 65 parts by weight of the vinyl chloride/vinyl (VAGH manufactured by UCC), a magnetic tape was produced.

Application Example 12

In the same manner as in Reference Example 8 except that 60 parts by weight of a vinyl chloride/vinyl acetate/vinyl alcohol copolymer (VAGH manufactured by UCC) and 5 parts by weight of the organic surface-treating agent obtained in Example 7 were used in place of 65 parts by weight of the vinyl chloride/vinyl (VAGH manufactured by UCC), a magnetic tape was produced.

Application Example 13

In the-same manner as in Reference Example 8 except that 60 parts by weight of a vinyl chloride/vinyl acetate/vinyl alcohol copolymer (VAGH manufactured by UCC) and 5 parts by weight of the organic surface-treating agent obtained in Example 8 were used in place of 65 parts by weight of the vinyl chloride/vinyl (VAGH manufactured by UCC), a magnetic tape was produced.

Application Example 14

In the same manner as in Reference Example 8 except that 60 parts by weight of a vinyl chloride/vinyl acetate/vinyl alcohol copolymer (VAGH manufactured by UCC) and 5 parts by weight of the organic surface-treating agent obtained in Example 9 were used in place of 65 parts by weight of the vinyl chloride/vinyl (VAGH manufactured by UCC), a magnetic tape was produced.

Application Example 15

In the same manner as in Reference Example 8 except that 60 parts by weight of a vinyl chloride/vinyl acetate/vinyl alcohol copolymer (VAGH manufactured by UCC) and 5 parts by weight of the organic surface-treating agent obtained in Example 10 were used in place of 65 parts by weight of the vinyl chloride/vinyl (VAGH manufactured by UCC), a magnetic tape was produced.

Application Example 16

In the same manner as in Reference Example 8 except that 60 parts by weight of a vinyl chloride/vinyl acetate/vinyl alcohol copolymer (VAGH manufactured by UCC) and 5 parts by weight of the organic surface-treating agent obtained in Example 11 were used in place of 65 parts by weight of the vinyl chloride/vinyl (VAGH manufactured by UCC), a magnetic tape was produced.

Application Example 17

In the same manner as in Reference Example 8 except that 60 parts by weight of a vinyl chloride/vinyl acetate/vinyl alcohol copolymer (VAGH manufactured by UCC) and 5 parts by weight of the organic surface-treating agent obtained in Example 12 were used in place of 65 parts by weight of the vinyl chloride/vinyl (VAGH manufactured by UCC), a magnetic tape was produced.

Each of the magnetic tapes prepared in above Application Examples was set in an 8 mm video tape cassette, and its chromatic S/N ratio, C/N ratio and RF output were measured. The results are shown in Table 3.

TABLE 3

|  | Chromatic S/N ratio (dB) | C/N ratio (dB) | RF output (dB) |
| --- | --- | --- | --- |
| Reference Example 8 | 0 | 0 | 0 |
| Reference Example 9 | 0.6 | 0.6 | 0.4 |
| Application Example 6 | 2.1 | 2.4 | 1.9 |
| Application Example 7 | 2.6 | 2.9 | 2.0 |
| Application Example 8 | 2.6 | 2.4 | 2.1 |
| Application Example 9 | 2.1 | 2.3 | 1.8 |
| Application Example 10 | 2.9 | 2.7 | 2.3 |
| Application Example 11 | 2.8 | 2.9 | 2.2 |
| Application Example 12 | 2.5 | 2.7 | 2.0 |
| Application Example 13 | 2.0 | 2.3 | 2.0 |
| Application Example 14 | 1.9 | 2.2 | 1.9 |
| Application Example 15 | 2.5 | 3.0 | 2.0 |
| Application Example 16 | 1.8 | 2.3 | 1.7 |

TABLE 3-continued

|  | Chromatic S/N ratio (dB) | C/N ratio (dB) | RF output (dB) |
| --- | --- | --- | --- |
| Application Example 17 | 3.0 | 2.9 | 2.3 |

From the above results, the organic surface-treating agents of the present invention contribute to the increase of the dispersibility of the ferromagnetic powder.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An organic surface-treating agent consisting essentially of repeating units of carbon and hydrogen atoms forming a lipophilic linear backbone chain, at least two side chains selected from at least one member of the group consisting of an ester, ether, ketone and phenyl group on said backbone chain and a hydrophilic or reactive functional group joined to at least one molecular end of said backbone chain, wherein said organic surface-treating agent has a number average molecular weight of at least 300.

2. The organic surface-treating agent according to claim 1, wherein said hydrophilic or reactive functional group is selected from at least one member of the group consisting of —COOX, —OH, —NH$_2$, —NH$_3$, —NHR, —NH$_2$R, —NRR', —NH$^{3+}$, —NH$_2$R+, —NHRR'+, —NRR'R'', —SO$_3$X, —OSO$_3$X, —OP(O)—(OX)$_2$, —OP(O)(OX)(OR), —OP(O)(OR)$_2$, —P(O)(OX)$_2$, —P(O)(OX)—(OR), —P(O)$_2$, —Si(OR)$_2$, —Si(OR)$_3$, —SiR(OR')$_2$, —N=C=O and —CH(O)CH$_2$, wherein X is a hydrogen atom or a metal atom, and R, R' and R'' are each an alkyl group.

3. The organic surface-treating agent according to claim 1, wherein said hydrophilic or reactive functional group is selected from at least one member of the group consisting of —COOX, —NH$_2$, —NHR, -NRR', —SO$_3$X, —OSO$_3$X, —OP(O)(OX)$_2$, —P(O)(OX)$_2$, —Si(OR)$_3$, —SiR(OR')$_2$ and —CH(O)CH$_2$, wherein X is a hydrogen atom or a metal atom, and R and R' are each an alkyl group.

4. The organic surface-treating agent according to claim 1, wherein said side chains include at least one member selected from the group consisting of —COOH, —OH, —NH$_2$, —NHR, —NRR', —CH(O)CH$_2$, wherein R and R' are each an alkyl group, and an ammonium salt.

5. The organic surface-treating agent according to claim 1, wherein said lipophilic linear backbone chain is an acrylic resin or a polystyrene.

6. The organic surface-treating agent according to claim 1, wherein said number average molecular weight ranges from 800 to 25,000.

7. The organic surface-treating agent according to claim 6, wherein said number average molecular weight is from 1500 to 15,000.

* * * * *